(12) United States Patent
Katzer et al.

(10) Patent No.: US 7,769,009 B1
(45) Date of Patent: Aug. 3, 2010

(54) AUTOMATIC PEER TO PEER MOBILE DEVICE DATA REPLICATION

(75) Inventors: Robin D. Katzer, Olathe, KS (US); Carl J. Persson, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 532 days.

(21) Appl. No.: 11/609,233

(22) Filed: Dec. 11, 2006

(51) Int. Cl.
*H04L 12/00* (2006.01)

(52) U.S. Cl. .................... 370/390; 455/412.1; 370/432; 370/312; 709/217

(58) Field of Classification Search ................ 455/519, 455/412.1; 370/390, 432, 312; 709/217
See application file for complete search history.

(56) References Cited

U.S. PATENT DOCUMENTS

| | | | |
|---|---|---|---|
| 6,661,799 B1* | 12/2003 | Molitor ...................... 370/401 |
| 7,313,657 B1 | 12/2007 | Katzer et al. |
| 7,509,372 B2* | 3/2009 | Dutta et al. ................. 709/203 |
| 7,580,368 B2* | 8/2009 | Yoneda et al. .............. 370/254 |
| 2002/0143918 A1* | 10/2002 | Soles et al. ................. 709/223 |
| 2003/0177261 A1* | 9/2003 | Sekiguchi et al. .......... 709/238 |
| 2004/0071123 A1* | 4/2004 | Shin ........................... 370/338 |
| 2004/0162819 A1* | 8/2004 | Omae et al. .................... 707/3 |
| 2004/0196978 A1* | 10/2004 | Godfrey et al. ............. 380/270 |
| 2005/0117529 A1* | 6/2005 | Ramos-Escano et al. .... 370/282 |
| 2005/0141507 A1* | 6/2005 | Curtis ........................ 370/392 |
| 2005/0163320 A1* | 7/2005 | Brown et al. ................ 380/270 |
| 2006/0083212 A1* | 4/2006 | Colban et al. ............... 370/349 |
| 2006/0126619 A1* | 6/2006 | Teisberg et al. ............. 370/389 |
| 2006/0128364 A1* | 6/2006 | Costa-Requena et al. 455/414.3 |
| 2006/0245408 A1* | 11/2006 | Lee et al. .................... 370/338 |
| 2006/0259624 A1* | 11/2006 | Hu et al. ..................... 709/226 |
| 2007/0002837 A1* | 1/2007 | Tan ............................. 370/352 |
| 2007/0100941 A1* | 5/2007 | Lee et al. .................... 709/204 |
| 2008/0126403 A1* | 5/2008 | Moon ..................... 707/103 R |
| 2008/0254833 A1* | 10/2008 | Keevill et al. ............... 455/558 |

* cited by examiner

*Primary Examiner*—Lewis G West
*Assistant Examiner*—Qun Shen

(57) ABSTRACT

This present disclosure allows files and data stores to be automatically replicated directly from one mobile device to other mobile devices within a mobile environment. The disclosed systems and methods enable a group of mobile device users to maintain a dynamic data store of current data for shared use and modification. Configurable software allows mobile users to select predefined events or triggers that will automatically cause a data store to be replicated from that user's mobile device to every other mobile device in a specified group.

16 Claims, 4 Drawing Sheets

AUTOMATIC PEER TO PEER MOBILE DEVICE DATA REPLICATION

CROSS-REFERENCE TO RELATED APPLICATIONS

None.

STATEMENT REGARDING FEDERALLY SPONSORED RESEARCH OR DEVELOPMENT

None.

REFERENCE TO A MICROFICHE APPENDIX

None.

BACKGROUND

With various technologies, today's workforce is becoming increasingly mobile. Various telecommunications devices have enabled employees to send and receive mails, as well as receive and make telephone calls to other employees from remote locations. As mobile devices are gaining additional functionality users are relying on them more and more as mobile workplaces.

These increasingly complex mobile environments have created difficulties. For example, with existing mobile technology, it is difficult to ensure information is received by mobile users in a timely manner. It is also difficult for mobile users to access up to date work product. Different mobile users become aware of and have access to updated information at different times and as a result workers efforts can overlap. Multiple technologies may be employed in order for a mobile device to receive all the information needed to respond or to perform assigned tasks. Commonly several technologies are employed or the same technology is employed repeatedly to ensure information has been received by all mobile users in a mobile environment. This situation increases organization cost and causes inefficient use of time, effort and resources.

A mobile user in a given mobile environment would benefit from the ability to access and update the most current version of shared information within their mobile environment. This would be useful in a variety of industries specifically those having mobile work environments with multiple field workers. For example, all field workers in a given mobile work environment could view and update the status of work assignments in a shared queue, and receive new work assignments in conjunction with data needed to perform those assignments. Each mobile user could work more efficiently from this up-to-date view including changes as they are made by other users. This would be useful in areas including, but not limited to, field maintenance work, real estate development, construction and oil field development. Some existing devices may have mechanisms for manual data exchange between mobile users but such mechanisms are inadequate for these types of system wide applications.

SUMMARY

Accordingly, systems and methods for automatic peer to peer mobile-device based data replication are provided. In an embodiment the data replication method and system is triggered by a predefined event defined in configurable software contained on a source mobile device having an IP address. The source mobile device uses a mobile device communications network to send a SMS data replication request containing the source mobile IP address to a target mobile device. The target mobile device uses the source mobile IP address to respond and provide its target mobile IP address to the source mobile device. A direct communication channel between the source mobile device and the target mobile device is created. An existing data store on the source mobile device is replicated to create an identical data store on the target mobile device through the direct communication channel. A data store may be replicated by copying the whole thing, or by making updates using data block changes or by duplicating the individual transactions on the data store.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following description, taken in connection with the accompanying drawings, wherein like reference numerals represent like parts.

DETAILED DESCRIPTION

Figure 1:
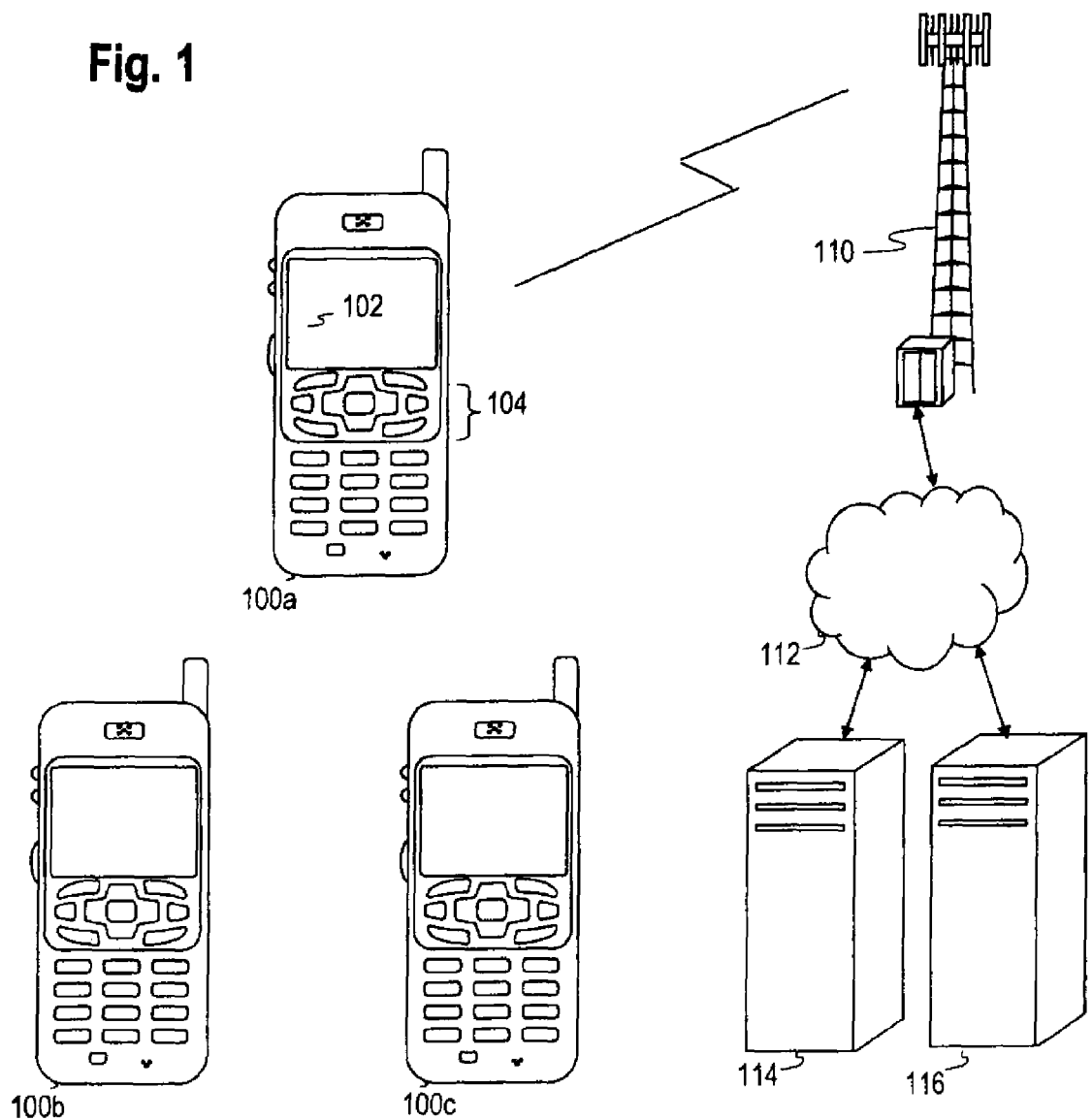
FIG. 1 shows an illustrative wireless communications system.

It should be understood at the outset that although an illustrative implementation of various embodiments is provided below, the present system may be implemented using any number of techniques, whether currently known or not yet in existence. The present disclosure should in no way be limited to the illustrative implementations, drawings, and techniques illustrated below.

This present disclosure allows files and data stores to be automatically replicated directly from one mobile device to other mobile devices within a mobile environment. The disclosed systems and methods enable a group of mobile device users to maintain a dynamic data store of current data for shared use and modification. Configurable software allows mobile users to select predefined events or triggers that will automatically cause a data store to be replicated from that user's mobile device to every other mobile device in a specified group.

The following explanation describes an illustrative interaction between two mobile devices within a larger mobile environment. In practice there can be many mobile devices. A source mobile device is a mobile device where a trigger has occurred and contains a data store that needs to be replicated. A target mobile device is a mobile device in the environment where the data store will be replicated. Once a trigger has occurred, the source mobile device will ascertain its IP address internally within the device, externally through a reference server or both depending on the devices and the environment. The source mobile device then inserts its IP address into a data replication request that is sent to the target mobile device using a mobile device number (MDN). The data replication request can be sent through the mobile carrier's network through a short message system (SMS) server for example. As used herein, the term "SMS" refers to Short Message System ("SMS"), a service available on most digital mobile phones that permits the sending of short messages (also known as text messages, messages, or more colloquially SMSes, texts or even txts) between mobile phones, other handheld devices.

The source mobile device then waits or listens for a response from the target mobile device. The target mobile device will use the source mobile device IP address contained in the data replication request to automatically send a response back to the source mobile device. When the target mobile device receives the data replication request from the source mobile the target mobile device ascertains its IP address and inserts it into a response. Once the source mobile device receives the response, a direct communication channel with the target mobile device is opened using the target mobile's IP address. The identified data store on the source mobile device is then replicated over the direct communication channel from the source mobile device to the target mobile device. Direct data communication channels can be created in this manner between one source mobile device and multiple target mobile devices. A source mobile device can send out a data replication request to each of multiple target mobile devices on demand or automatically based on a predefined event or trigger. For example, the configurable software could be defined to trigger a replication request on a mobile device when a specified datastore has been updated, created, deleted or based on a timing schedule. Any given mobile device within a mobile environment can act as a source mobile device and a target mobile device. The source device can open up multiple communication channels on different ports of the source mobile device or employ a mechanism to automatically prioritize target mobile device responses and open direct communication channels. The direct data communication channel allows for data replication without uploading to and downloading from an intermediary device. However, in an embodiment, an intermediary device may be employed in addition to the direct communication channel. The data replication request, response and communication channels are created automatically. However, in an embodiment, there can be manual override of the automatic system based on settings in the configurable software. In an embodiment each mobile device or selected mobile devices within an environment can shift replication responsibility to other mobile devices. In alternate embodiments the direct communication channel can be accomplish by other means that allow data transfer. In alternate embodiments the direct data communication channel may be used to perform additional operations between the mobile devices.

FIG. 1 shows a wireless communications system including an illustrative mobile devices 100a-100c. Though illustrated as mobile phones, devices 100a-100c may take various forms including personal digital assistants (PDAs), mobile computers, digital cameras, digital music players, digital calculators, and electronic key fobs for keyless entry. Many suitable mobile devices combine some or all of these functions. In some preferred implementations, the mobile devices are not general purpose computing devices like notebooks or tablet computers, but rather are special-purpose communications devices such as mobile phones, pagers, or PDAs.

Representative mobile device 100a includes a display 102 and a touch-sensitive surface or keys 104 with which to interact with the user. The mobile device may present options for the user to select, controls for the user to actuate, and/or cursors or other indicators for the user to direct. The mobile device may further accept data entry from the user, including numbers to dial or various parameter values for configuring the operation of the mobile device. Mobile device 100a may further execute one or more software or firmware applications in response to user commands. These applications may configure the mobile device 100a to perform various customized functions in response to user interaction. In addition these applications may create output or data stores that can be overwritten or edited depending on user interaction. The user may in turn want to share newly created or updated data stores with other mobile users in their environment. The present disclosure presents methods and systems for automatic replication of data stores which are particularly useful where the environment may be too large or the creation and updating of data stores too frequent to warrant manual sharing.

A typical mobile carrier framework enables customized applications that implement business or domain specific functionality on top of the carrier framework. The communication is obtained via wireless communications with a cell tower 110 or a wireless network access node. The cell tower 110 (or wireless network access node) is coupled to a wired network 112, such as the Internet. Via the wireless link and the wired network, the mobile device 100a has access to information on various servers 114 and 116. One of the servers 114 may provide reference Internet protocol (IP) addresses for mobile devices with dynamic internet protocol addressing. Another server 116 may facilitate SMS communication between mobile devices.

Figure 2:
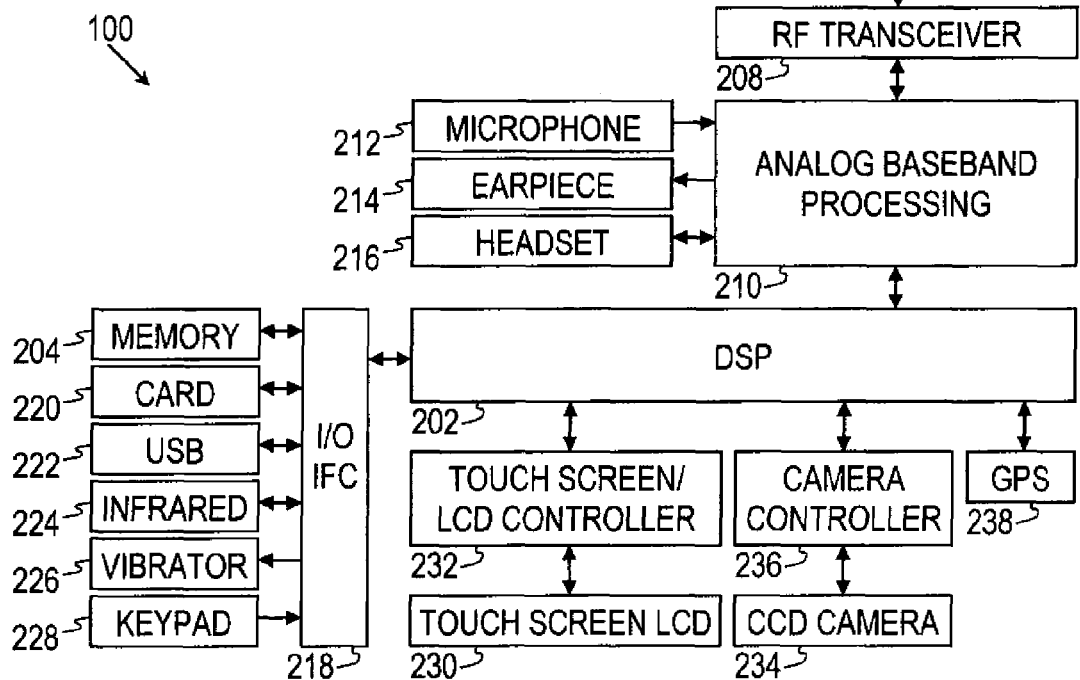
FIG. 2 shows a block diagram of an illustrative mobile device.

FIG. 2 shows a block diagram of illustrative mobile device 100a. Mobile device 100a includes a digital signal processor (DSP) 202 and a memory 204. As shown, illustrative mobile device 100a may further include an antenna and front end unit 206, a radio frequency (RF) transceiver 208, an analog baseband processing unit 210, a microphone 212, an earpiece speaker 214, a headset port 216, an input/output interface 218, a memory card 220, a universal serial bus (USB) port 222, an infrared (IR) port 224, a vibrator 226, a keypad 228, a liquid crystal display (LCD) with a touch sensitive surface 230, a touch screen/LCD controller 232, a charge-coupled device (CCD) camera 234, a camera controller 236, and a global positioning system (GPS) sensor 238. Information about the user's interaction with any of these components can also be considered in a data replication request, response or data store. For instance a source mobile device's data replication request or target mobile device's response can include the device's global position in addition to the IP address. The mobile device global position can also be replicated as a component of a data store.

The DSP 202 or some other form of controller or central processing unit operates to control the various components of the mobile device in accordance with embedded software or firmware stored in memory 204. In addition to the embedded software or firmware, the DSP 202 may execute other applications stored in memory 204 or made available via information carrier media such as portable data storage media like memory card 220 or via wired or wireless network communications. The application software may comprise a compiled set of machine-readable instructions that configure the DSP to provide the desired functionality, or the application software may be high-level software instructions to be processed by an interpreter or compiler to indirectly configure the DSP.

An antenna and front end unit 206 may be provided to convert between wireless signals and electrical signals, enabling mobile device to send and receive information from a cellular network or some other available wireless communications network. The RF transceiver 208 provides frequency shifting, converting received RF signals to baseband and converting baseband transmit signals to RF. Analog baseband processing unit 210 may provide channel equalization and signal demodulation to extract information from received signals, may modulate information to create transmit signals, and may provide analog filtering for audio signals. To that end, the analog baseband processing unit 210 may have ports for connecting to a built-in microphone 212 and earpiece speaker 214 that enable the mobile device 100a to be used as a cell phone. The analog baseband processing unit 210 may further include a port for connecting to a headset or other hands-free microphone and speaker configuration.

DSP 202 may send and receive digital communications with a wireless network via analog baseband processing unit 210. In some embodiments, these digital communications may provide Internet connectivity, enabling a user to gain access to content on the Internet and to send and receive email or text messages. An input/output interface 218 interconnects the DSP 202 and various memories and interfaces. Memory 204 and removable memory card 220 may provide software and data to configure the operation of DSP 202. Among the interfaces may be a USB interface 222 and an infrared (IR) port 224. The USB interface may enable the mobile device 100a to function as a peripheral device to exchange information with a personal computer or other computer system. The IR port 224 and other optional ports such as a Bluetooth interface or an IEEE 802.11 compliant wireless interface may enable the mobile device 100a to communicate wirelessly with other nearby mobile devices and/or wireless base stations. In some contemplated systems, the mobile device 100a is able to wirelessly exchange information at a point-of-sale when placed near a suitable transceiver.

Input/output interface 218 may further connect the DSP 202 to a vibrator 226 that, when triggered, causes the mobile device 100a to vibrate. The vibrator 226 may serve as a mechanism for silently alerting the user to any of various events such as an incoming call.

A keypad 228 couples to the DSP 202 via interface 218 to provide one mechanism for the user to make selections, enter information, and otherwise provide input to the mobile device 100a. Another input mechanism may be a touch screen display 230, which may also display text and/or graphics to the user. A display controller 232 couples the DSP 202 to the touch screen display 230.

CCD camera 234 enables the mobile device 100a to take digital pictures. The DSP 202 communicates with the camera 234 via a camera controller 236. GPS sensor 238 is coupled to DSP 202 to decode global positioning system signals, thereby enabling the mobile device to determine its position. Various other peripherals may also be included to provide additional functions, e.g., radio and television reception.

Figure 3:
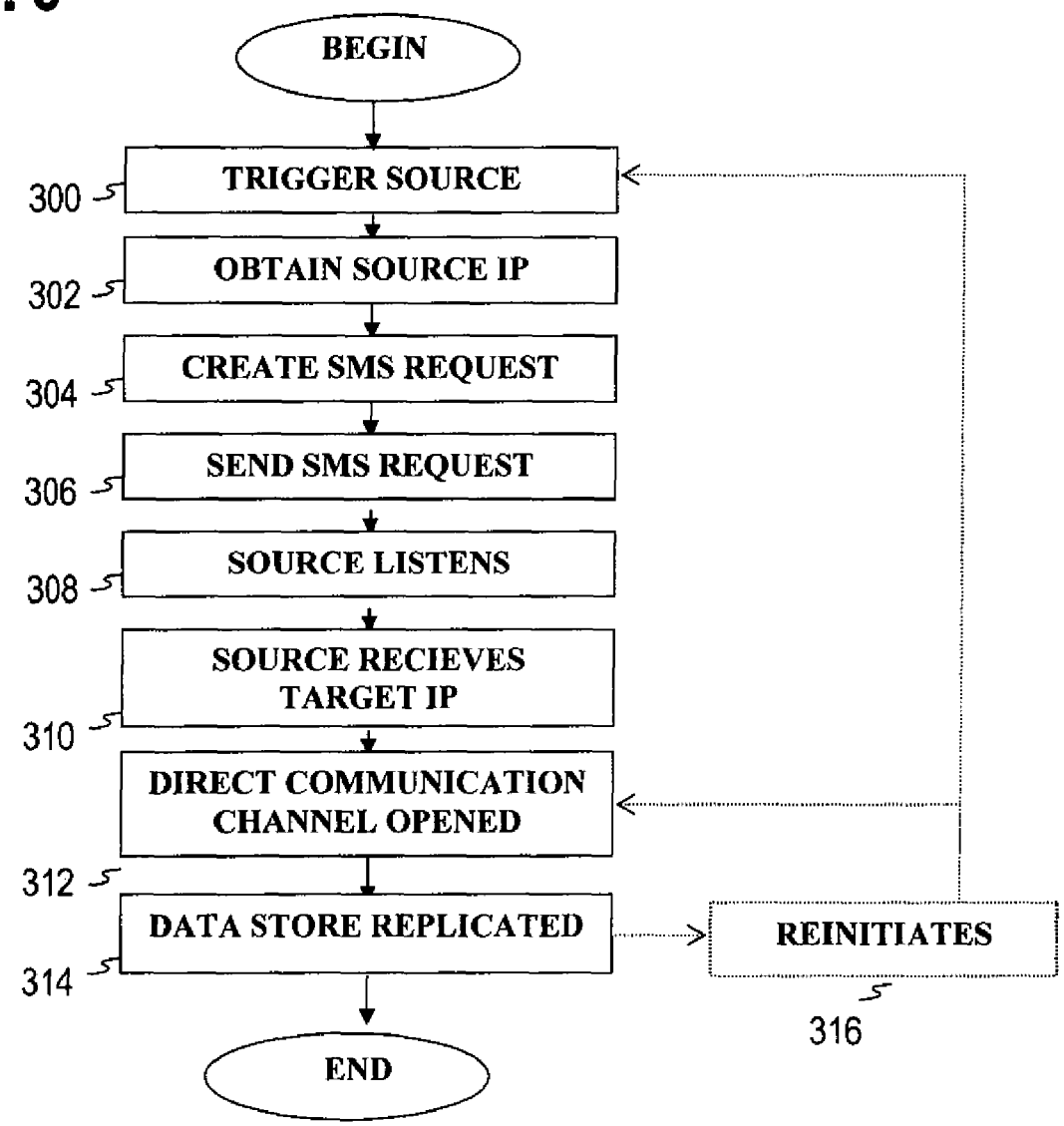
FIG. 3 is a flowchart of an illustrative method of mobile device peer to peer data replication.

FIG. 3 shows an overview flowchart of the method for automatic peer to peer mobile device data replication. In block 300, the method is automatically triggered by a predefined event or trigger on the source mobile device. The data replication application would be assigned to operate from a port on the source mobile device. In block 302, the source mobile device obtains its own IP address from within the mobile device itself or by communicating with a reference server. In block 304, once the IP address is ascertained it is inserted into a SMS data replication request message. In block 306, the SMS data replication request message is sent to the target mobile device identified by a target mobile device number or MDN. The SMS data replication request message is communicated through the wireless communications system to a SMS center and routed and received by the target mobile device. The target mobile device activates a data replication application assigned to a port on the target mobile device. In block 308, the source mobile device will actively wait or "listen" for a response from the target mobile device from an assigned port on the source mobile device. In block 310, the source mobile device receives an IP communicated response directly from the target mobile phone. The source mobile device hears the response through the port in which it has been listening. The response contains the IP address of the target mobile device. In block 312, a direct IP communication channel can now be opened from the source mobile device to the target mobile device and using the target mobile device's IP address. In block 314, data stores are replicated from the source mobile device to the target mobile device over the direct communication channel. In another embodiment, the source mobile device can make a request to replicate data from the target mobile device or either device can replicate data stores to and from the other. Once the desired result is obtained, the channel can be closed. In another embodiment the channel can be left open. Block 316 shows a scenario in which the data communication channel is terminated before the desired result is obtained. The process can be reinitiated from the target mobile device assuming IP addresses remain unchanged or from the source mobile device if IP addresses have changed.

In an embodiment, the configurable software will allow a current replicating mobile device to shift responsibility for replication of the data store to another mobile device. Referring to FIG. 1. for example, mobile device 100a attempts to replicate a data store to mobile device 100b and mobile device 100c. Mobile device 100a is successful in replicating the data store to mobile device 100b but unsuccessful in replicating to mobile device 100c. Mobile device 100a can reinitiate the process to mobile device 100c or request that mobile device 100b attempt to replicate the data store already from mobile device 100a to mobile device 100c. In this embodiment information is replicated through a grapevine approach until everyone in the environment has been updated. All the processes in all embodiments presented can be reordered to accomplish the same result.

Figure 4:
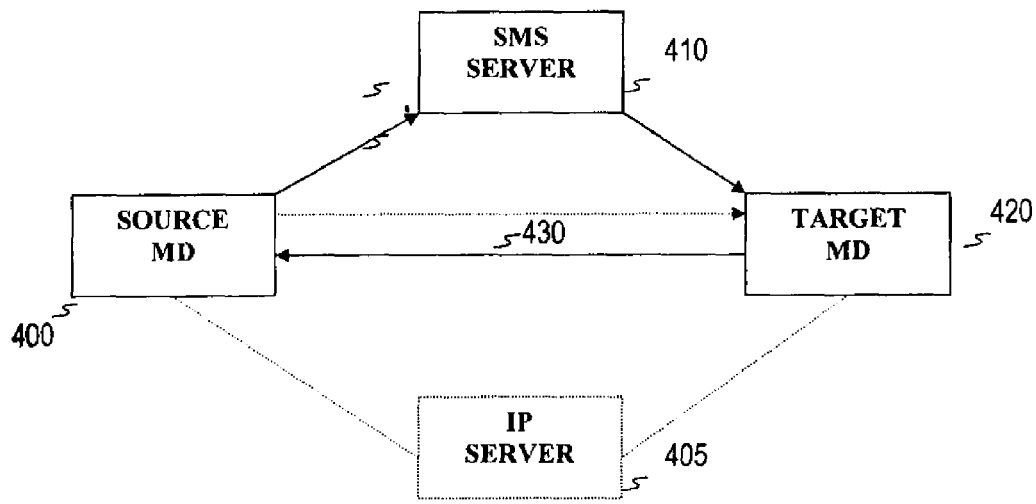
FIG. 4 is first information flow diagram for an illustrative data replication method.

FIG. 4 shows a high level system environment of one source mobile device 400 opening a direct data communication channel 430 with one target mobile device 420. An optional IP reference server is provided if needed to ascertain the source and target mobile device IP addresses. The original SMS data replication request is sent through an SMS center 410. The direct data communication channel is established using the source mobile IP address sent in the SMS message and the target mobile device IP address in the response sent to the source mobile device.

Figure 5:
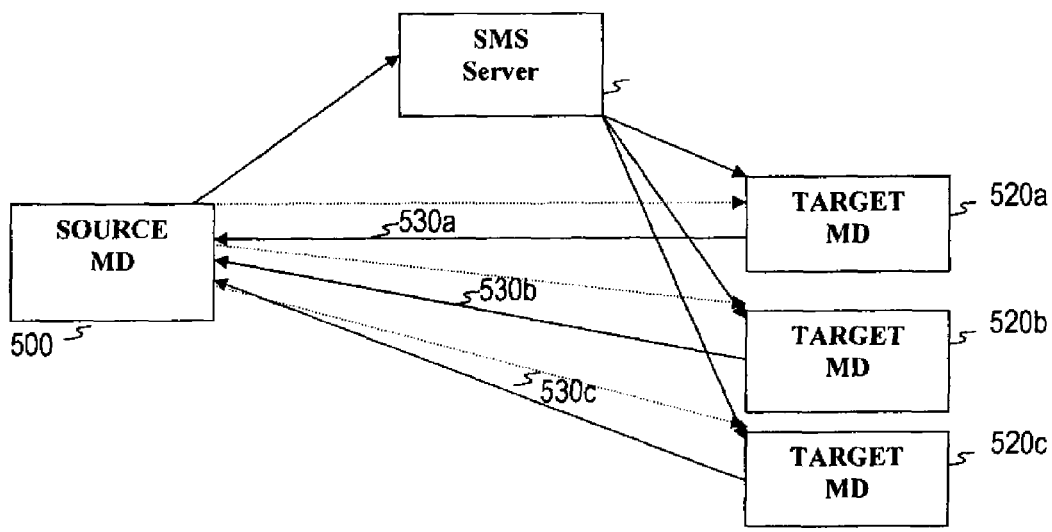
FIG. 5 is a second information flow diagram for an illustrative data replication method with multiple target mobile devices.

FIG. 5 shows a high level system environment of one source mobile device 500 opening multiple direct data communication channels 530 a-530c series with multiple target mobile devices 520a-520c series. The original SMS data replication request is sent through an SMS center 510. The direct data communication channels are established using the source mobile IP address sent in the SMS messages and the target mobile device IP addresses in the responses sent to the source mobile device. In other embodiments multiple source mobile devices can open communication channels with one target mobile device and multiple source devices can open communication channels with multiple target mobile devices. It would therefore be possible for any given mobile device to act as a source mobile device and a target mobile device for multiple communication channels simultaneously. Conflict avoidance methodology can be incorporated in conjunction with the data replication applications on the mobile devices in order to prioritize the various request and responses. See application Ser. No. 11/088,660 Robin D. Katzer, et al. entitled CONFLICT AVOIDANCE IN DATA STORE REPLICATION.

In some embodiments, it may be expected that multiple users will attempt to modify the data store at more or less the same time. This issue may be addressed in a number of ways. In some embodiments, a given user is not allowed to modify the data store (or a specified portion of the data store) until write permission is first obtained from the designated "owner" of the data store or the specified portion. (In some implementations, ownership resides with the last device to modify the data store or specified portion thereof.)

In other embodiments, modification is performed on a speculative basis, and to the extent that concurrent modifications are not inconsistent (e.g., modifications to different parts of the data store), they are each accepted. However, where modifications are in conflict (e.g., two different workers accepting the same job assignment), prioritization may be employed to determine which modification succeeds and which modification fails. Preferably, a user is notified when his or her modification fails, or when an excessive time passes without confirmation that the modification has succeeded or failed (e.g., when a mobile device is out of range).

The system and methods described would be useful in organizations that have rapid and concurrent updates occurring in the field or workers accepting assignments and problem shooting in the field. For example, during an emergency a crisis management team, a utility repair crew, rescue workers or a medical triage team may have many field workers deployed who need to be in constant contact. The system and methods described could help ensure efficient communication and effective assignment of resources. Assignments lists can be prioritized and communicated to the mobile environment. Emergency workers within a mobile environment can accept assignments and notify others immediately within the mobile environment that they have done so. Emergency workers within a mobile environment can be notified as others accept assignments, assignments or reprioritized or if additional resources are needed. In addition, emergency workers could have immediate access to information being generated in the field such as reports or images created by an emergency worker's source mobile device. In this manner the magnitude of the emergency could be assessed, important and relevant information captured and organized, resources allocated and deployed, the progress of recovery tracked and emergency plans reevaluated. This can occur even in emergency situations where electricity and communication channels have been compromised because information sharing can be accomplished optionally without uploading to or downloading from a central server. Also because the source device can share or transfer the responsibility of communicating the replication request with other target devices within the mobile environment, information or datastores can continued to be replicated throughout the mobile environment even if the source device is temporarily disconnected.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method for automatic peer to peer data replication between mobile devices comprising:
   detecting a trigger by a source mobile device;
   responsive to detecting the trigger, generating a data replication request at the source mobile device;
   inserting a first Internet Protocol (IP) address of the source mobile device into the data replication request;
   thereafter sending the data replication request having the first IP address of the source mobile device to a target mobile device;
   thereafter receiving from the target mobile device a response, wherein the response includes a second IP address of the target mobile device, and wherein the first and second IP addresses are different;
   opening a direct communication channel between the source mobile device and the target mobile device using the target and source IP address;
   replicating a data store from the source mobile device to the target mobile device using the direct communication channel, wherein an existing data store on the target mobile device is replicated to create an identical data store on the source mobile device.

2. The method for automatic peer to peer data replication between mobile devices of claim 1 wherein replication is triggered by a predefined event occurring on a device in the mobile environment.

3. The method for automatic peer to peer data replication between mobile devices of claim 1 wherein there is no dedicated device containing a central data store wherein data is routinely replicated to the environment.

4. The method for automatic peer to peer data replication between mobile devices of claim 1 wherein a mobile device can shift the responsibility of replicating a data store to another mobile device.

5. The method for automatic peer to peer data replication between mobile devices of claim 3 wherein a mobile device can shift the responsibility of replicating a data store to another mobile device.

6. The method for automatic peer to peer data replication between mobile devices of claim 1 wherein configurable software allows for manual overrides of the automatic method.

7. The method for automatic peer to peer data replication between mobile devices of claim 1 wherein sending the data replication request from the source mobile device involves creating a short message system (SMS) message and utilizing an SMS server.

8. The method for automatic peer to peer data replication between mobile devices of claim 1 wherein data replication is accomplished through assigned ports on the source mobile device and target mobile device.

9. The method for automatic peer to peer data replication between mobile devices of claim 1 wherein one or more operations occur between the source and target mobile devices over the direct communication channel, wherein the one or more operations comprises at least one of creation, replication, update, delete, and initiation and control of one or more hardware and software components.

10. A system for automatic peer to peer data replication between mobile devices comprising:
- a source mobile device having a first Internet Protocol (IP) address, wherein the source mobile device is programmed, responsive to detecting a trigger, to generate a data replication request and to insert the first IP address into the data replication request, and wherein the source mobile device is further is programmed to transmit the data replication request via a short message system (SMS) to the target mobile device;
- a target mobile device having a second IP address, wherein the target mobile device is programmed to receive the data replication request and, in response, to generate a response message, wherein the target mobile device is further programmed to insert the second IP address into the response message and thereafter transmit the response message to the source mobile device;
- a direct communication channel between the source mobile device and the target mobile device created through direct IP communication between the source mobile device and the target mobile device, wherein the direct IP communication is established using the first IP address and the second IP address, wherein an existing data store on the source mobile device is replicated to create an identical data store on the target mobile device, wherein an existing data store on the target mobile device is replicated to create an identical data store on the source mobile device.

11. The system for automatic peer to peer data replication between mobile devices of claim 10 wherein a predefined event automatically triggers the sending of the data replication request.

12. The system for automatic peer to peer data replication between mobile devices of claim 10 wherein a mobile device can shift the responsibility of replicating a data store to another mobile device.

13. The system for automatic peer to peer data replication between mobile devices of claim 10 wherein configurable software allows for manual overrides of the automatic method.

14. The system for automatic peer to peer data replication between mobile devices of claim 10 wherein data replication is accomplished through assigned ports on the source mobile device and the target mobile device.

15. The system for automatic peer to peer data replication between mobile devices of claim 10 wherein one or more operations occur between the source and target mobile devices over the direct communication channel, wherein the one or more operations comprise at least one of creation, replication, update, delete, and initiation and control of one or more hardware and software components.

16. A non-transitory memory storing a program which, when executed, performs a computer implemented method for automatic peer to peer data replication between mobile devices, wherein the computer implemented method comprises:
- detecting a trigger by a source mobile device;
- responsive to detecting the trigger, generating a data replication request at the source mobile device;
- inserting a first Internet Protocol (IP) address of the source mobile device into the data replication request;
- thereafter sending the data replication request having the first IP address of the source mobile device to a target mobile device;
- thereafter receiving from the target mobile device a response, wherein the response includes a second IP address of the target mobile device, and wherein the first and second IP addresses are different;
- opening a direct communication channel between the source mobile device and the target mobile device using the target and source IP address;
- replicating a data store from the source mobile device to the target mobile device using the direct communication channel, wherein an existing data store on the target mobile device is replicated to create an identical data store on the source mobile device.

* * * * *